United States Patent [19]
Takizawa

[11] Patent Number: 5,107,724
[45] Date of Patent: Apr. 28, 1992

[54] ADAPTIVE CONTROL FOR MOTOR VEHICLE
[75] Inventor: Satoshi Takizawa, Yokosuka, Japan
[73] Assignee: Nissan Motor Co., Ltd., Yokohama, Japan
[21] Appl. No.: 625,662
[22] Filed: Dec. 12, 1990
[30] Foreign Application Priority Data
  Dec. 14, 1989 [JP] Japan .................. 1-324780
  Dec. 21, 1989 [JP] Japan .................. 1-329660
[51] Int. Cl.⁵ ............................................. B60K 41/06
[52] U.S. Cl. ...................................... 74/866; 123/478; 364/431.05
[58] Field of Search ............... 74/844, 857, 866, 867, 74/877; 123/478; 364/431.05

[56] References Cited

U.S. PATENT DOCUMENTS

| | | | |
|---|---|---|---|
| 4,187,814 | 2/1980 | Phelan et al. | 123/119 EC |
| 4,492,202 | 1/1985 | Muramatsu et al. | 123/478 |
| 4,590,563 | 5/1986 | Matsumura et al. | 364/431.05 |
| 4,656,864 | 4/1987 | Kraus et al. | 73/24 |
| 4,696,275 | 9/1987 | Kushi et al. | 123/478 |
| 4,831,537 | 5/1989 | Scarnera et al. | 364/431.05 |
| 4,959,789 | 9/1990 | Nakamura | 364/431.05 |

FOREIGN PATENT DOCUMENTS

| | | |
|---|---|---|
| 0007739 | 2/1980 | European Pat. Off. |
| 0171770 | 2/1986 | European Pat. Off. |
| 0312276 | 4/1989 | European Pat. Off. |
| 57-184755 | 11/1982 | Japan |
| 62-166118 | 7/1987 | Japan |
| 64-87949 | 4/1989 | Japan |

Primary Examiner—Dwight Diehl
Attorney, Agent, or Firm—Foley & Lardner

[57] ABSTRACT

In order to achieve adaptive correction of any undesired variance of servo activating hydraulic fluid pressure due to the change in ambient condition, a ratio ($K_Q$) of actual mass airflow rate of engine intake air to standard airflow rate is determined. This ratio is used in deriving a judgment as to the ambient condition or modifying standard servo activating hydraulic fluid pressure.

15 Claims, 14 Drawing Sheets

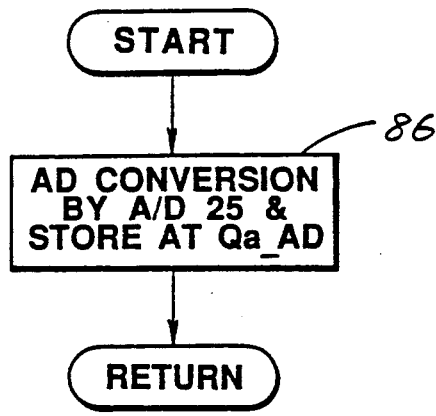
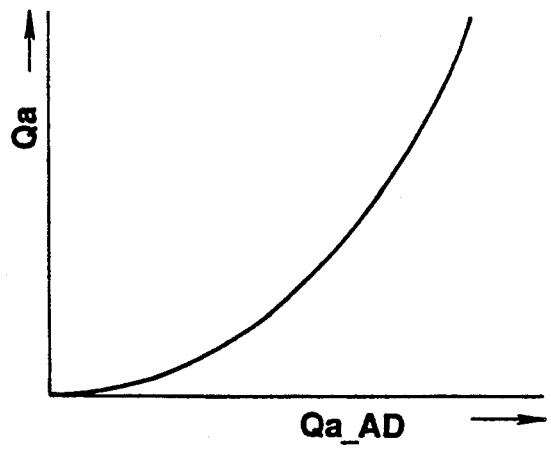
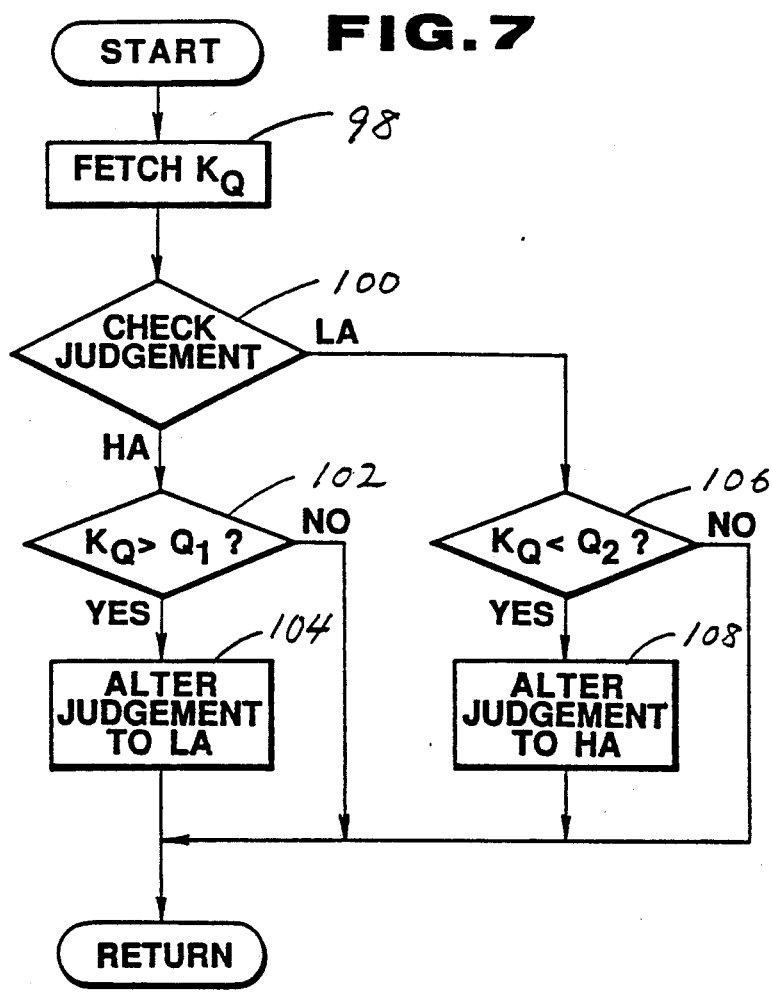

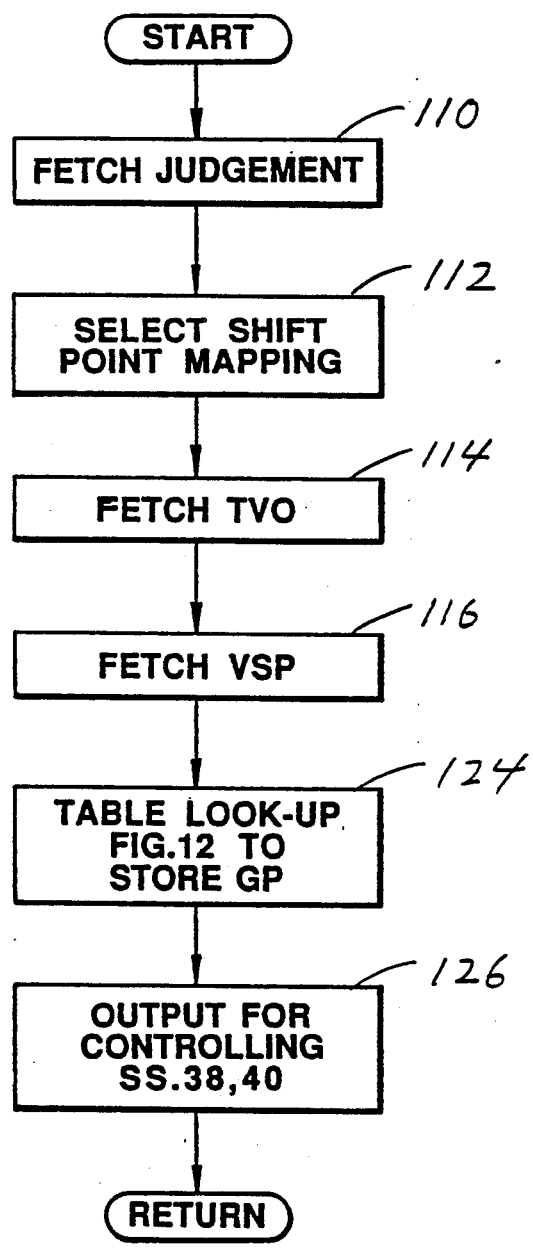

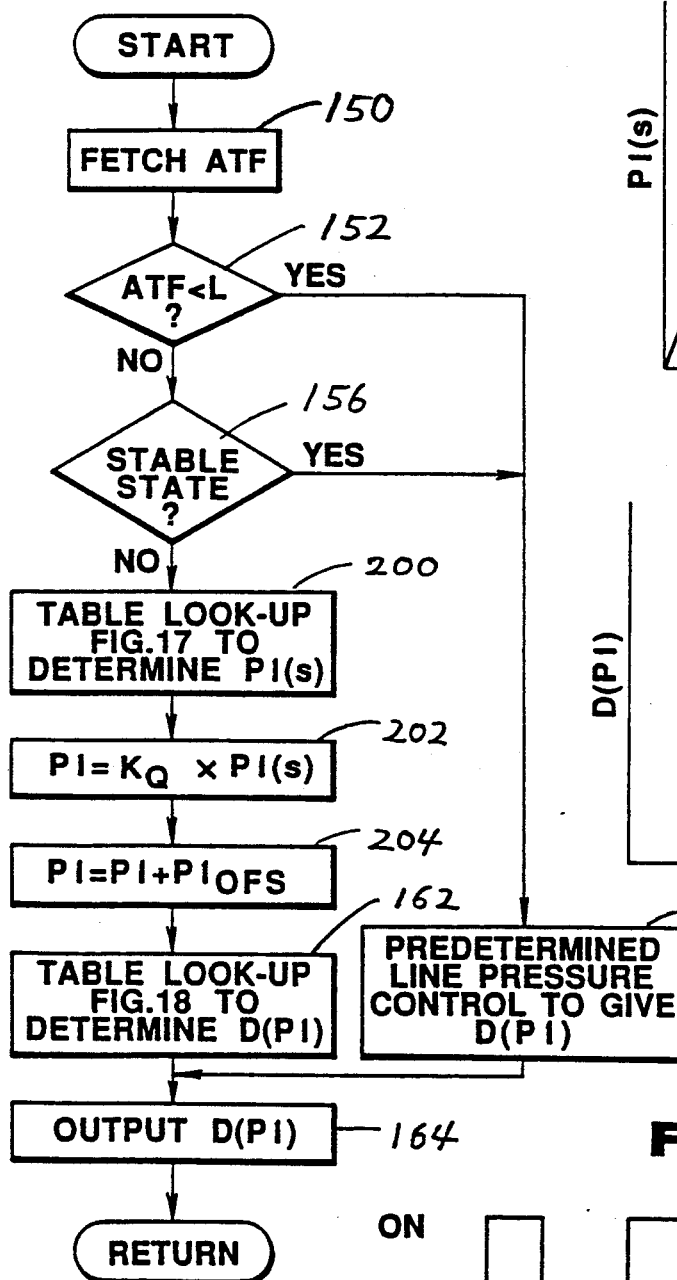
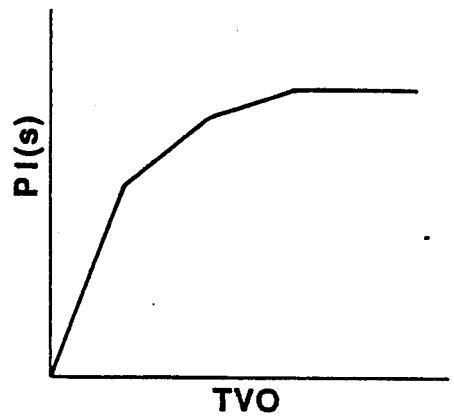
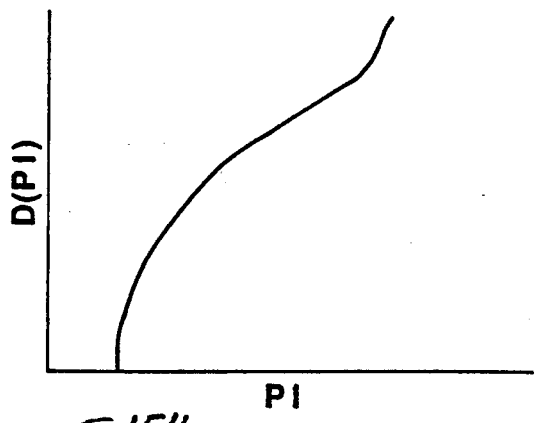
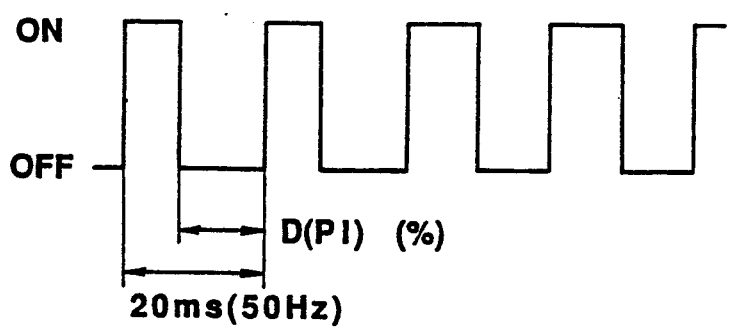

LOW ALTITUDE (0mmHg)

HIGH ALTITUDE

LOW ALTITUDE (0mmHg)

HIGH ALTITUDE

SHIFT POINT AT LOW SPEED (MANUAL RANGE)

SHIFT POINT AT SET SPEED (DRIVE RANGE)

SHIFT POINT AT HIGH SPEED (MANUAL RANGE)

SHIFT POINT AT LOW SPEED (MANUAL RANGE)

SHIFT POINT AT SET SPEED (DRIVE RANGE)

SHIFT POINT AT HIGH SPEED (MANUAL RANGE)

ADAPTIVE CONTROL FOR MOTOR VEHICLE

BACKGROUND OF THE INVENTION

The present invention relates to an adaptive control for a motor vehicle.

Engine output is affected by ambient conditions. At high altitude, since the air density drops, the engine output also drops. During a ratio shift, servo activating hydraulic fluid pressure supplied to engage on-coming friction device, such as a clutch or a brake, is determined in response to throttle opening degree. Thus, if the engine output drops due to an increase in altitude, a shift quality also drops. For adaptive correction of such an insufficiency, it is necessary to detect a change in ambient condition of the motor vehicle. One measure is to install a barometer to detect a change in altitude. This measure is costly, however, and thus, not acceptable.

Accordingly, an object of the present invention is to provide an economical measure to detect a change in ambient condition of a motor vehicle without installation of an additional equipment.

A specific object of the present invention is to provide an adaptive control for a motor vehicle wherein the setting of an automatic transmission is automatically adjusted to a new ambient condition.

SUMMARY OF THE INVENTION

According to the present invention, there is provided a system for an adaptive control of a motor vehicle including an engine, wherein an airflow ratio between an airflow rate of intake air admitted to the engine and a standard airflow rate predetermined for a power demand on the engine is used to determine a change in ambient altitude in which the engine is operating. in ambient condition.

According to one aspect of the present invention, there is provided a method of checking an ambient condition in which a motor vehicle is operating, the motor vehicle including an engine with a throttle valve which opens in degrees, the method comprising the steps of:

detecting a throttle opening degree of the throttle valve;

detecting an airflow rate of intake air admitted to the engine;

comparing said throttle opening degree detected with said airflow rate detected; and deriving a judgement as to the ambient condition from a result of said comparing step.

According to a specifict aspect of the present invention, there is provided a method of checking an ambient condition in which a motor vehicle is operating, the motor vehicle including an engine with a throttle valve which opens in degrees, the method comprising the steps of:

detecting the throttle opening degree;

detecting engine speed;

setting data containing standard airflow rate values versus throttle opening degree values and engine speed values;

determining a standard airflow rate versus said throttle opening degree and engine speed from said data set;

detecting an airflow rate of intake air admitted to the engine;

calculating an airflow ratio of said airflow rate detected to said standard airflow rate determined;

averaging said airflow ratio calculated; and deriving a judgement as to the ambient condition from said airflow ratio averaged.

According to another aspect of the present invention, there is provided a method of adaptive correction of servo activating hydraulic fluid pressure of an automatic transmission of a motor vehicle including an engine with a throttle valve which opens in degrees, the method comprising the steps of:

detecting the throttle opening degree;

detecting the engine speed;

setting data containing standard airflow rate values versus throttle opening degree values and engine speed values;

determining a standard airflow rate versus said throttle opening degree detected and said engine speed detected from said data set;

detecting an airflow rate of intake air admitted to the engine;

determining an airflow ratio of said airflow rate detected to said standard airflow rate determined;

determining a standard servo activating hydraulic fluid pressure in response to said throttle opening degree detected; and modifying said standard servo activating hydraulic fluid pressure in response to said airflow ratio determined.

BRIEF DESCRIPTION OF THE DRAWINGS

FIG. 5 is a flow diagram of an analog to digital conversion routine whereby analog output signal of a mass airflow meter is converted to digital signal to store the result at Qa_AD;

FIG. 6 shows a linear Qa vs., Qa_AD characteristic of the mass airflow meter;

FIG. 7 is a flow diagram of a routine for deriving a judgment regarding altitude from the airflow ratio $K_Q$;

FIG. 9 is an flow diagram of a routine for determining an appropriate gear position to fit the judgment;

FIG. 16 is a flow diagram of a routine for adaptive correction of the servo activating hydraulic fluid pressure;

FIG. 17 is a standard servo activating hydraulic fluid pressure data table used for the table look-up operation in FIG. 16;

FIG. 18 shows a duty conversion table used for the table look-up operation in FIG. 16;

FIG. 19 shows a duty output to the line pressure solenoid;

DETAILED DESCRIPTION OF THE INVENTION

Referring to the accompanying drawings, an embodiment according to the present invention is described in FIGS. 1 to 12.

Figure 1:
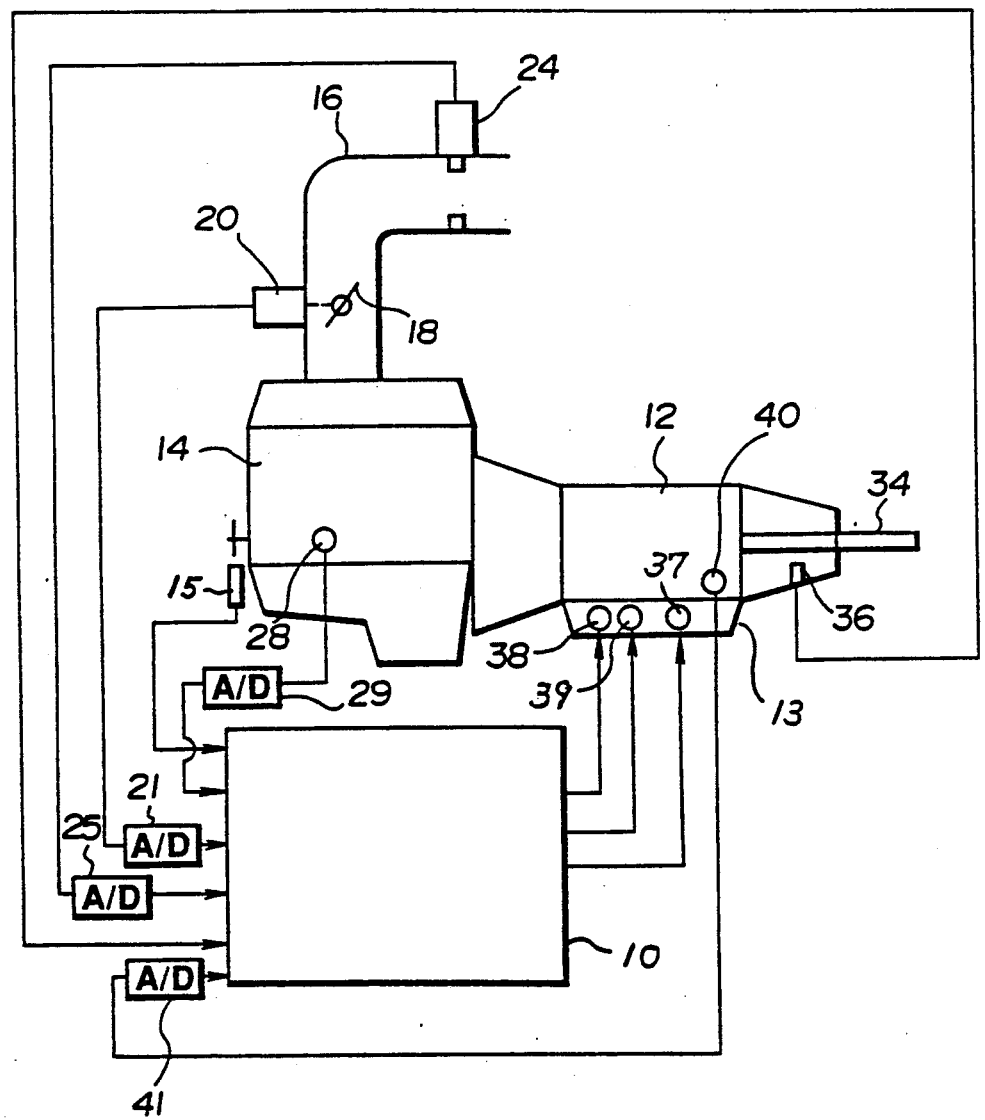
FIG. 1 is a block diagram of a motor vehicle power train.

FIG. 1 shows a motor vehicle power train including an automatic transmission 12 and an engine 14.

The automatic transmission 12 includes a torque converter, a gear train, and various friction or torque establishing devices, such as clutches and brakes. The torque converter includes a pump impeller drivingly connected to output shaft of the engine, a turbine runner, and a stator. The pump impeller is in driving connection with a pump. The turbine runner is connected to an input shaft of the gear train. The gear train has an output shaft 34.

The automatic transmission 12 has a control valve assembly 13 provided with a line pressure solenoid 37, a first shift solenoid 38, and a second shift solenoid 39. These solenoids 37, 38, and 39 are controlled by a microcomputer based control unit 10 including a central processor unit (CPU), a read only memory (ROM), a random access memeory (RAM) and an input/output interface circuit (I/O).

An engine speed sensor 15 detects engine speed (engine rpm) of the engine and generates pulses indicative of engine speed detected. Mounted within an intake passage 16 is a throttle valve 18 which opens in degrees. A throttle sensor 20 detects the opening degree of the throttle valve (throttle position) 18 and generates an analog signal indicative of the throttle opening degree detected. The analog signal of the throttle sensor 20 is supplied to an analog-to-digital converter (A/D) 21. Upstream of the throttle valve 18 is arranged a mass air flow meter 24 which detects mass air flow rate of intake air inducted by the engine 14, and generates an analog signal indicative of the mass airflow rate. This analog signal is supplied to an analog-to-digital converter (A/D) 25. The mass airflow meter 24 can be of the well-known hot wire film type. An engine coolant temperature element 28 detects the temperature of engine coolant and generates an analog signal indicative of the engine coolant temperature detected. This analog signal is supplied to an analog-to-digital converter (A/D) 29.

An output shaft speed sensor 36 detects revolution speed of the output shaft 34 and generates pulses indicative of the output shaft speed detected. The output shaft speed sensor 36 serves as a transmission mount vehicle speed sensor. Another vehicle speed sensor is mounted in a vehicle speed meter within a passenger compartment of the vehicle. An automatic transmission fluid (ATF) temperature sensor 40 detects the temperature of automatic transmission fluid and generates an analog signal indicative of the ATF temperature detected. This analog signal is supplied to an analog-to-digital (A/D) converter 41.

In FIG. 1, A/D converters 21, 25, 29 and 41 are illustrated as being separated from the control unit 10 for ease of explanation in the following description. Actually, the functions of these analog-to-digital converters are incorporated in the I/O interface circuit of the control unit 10.

Except the mass airflow meter 24, the motor vehicle power train illustrated in FIG. 1 is substantially the same as described in a publication "NISSAN FULL-RANGE AUTOMATIC TRANSMISSION RE4R-03A TYPE, SERVICE MANUAL, (A261c10)" issued on March 1988 by NISSAN MOTOR COMPANY LINITED. For a detailed description, reference should be made to this publication.

Figure 2:
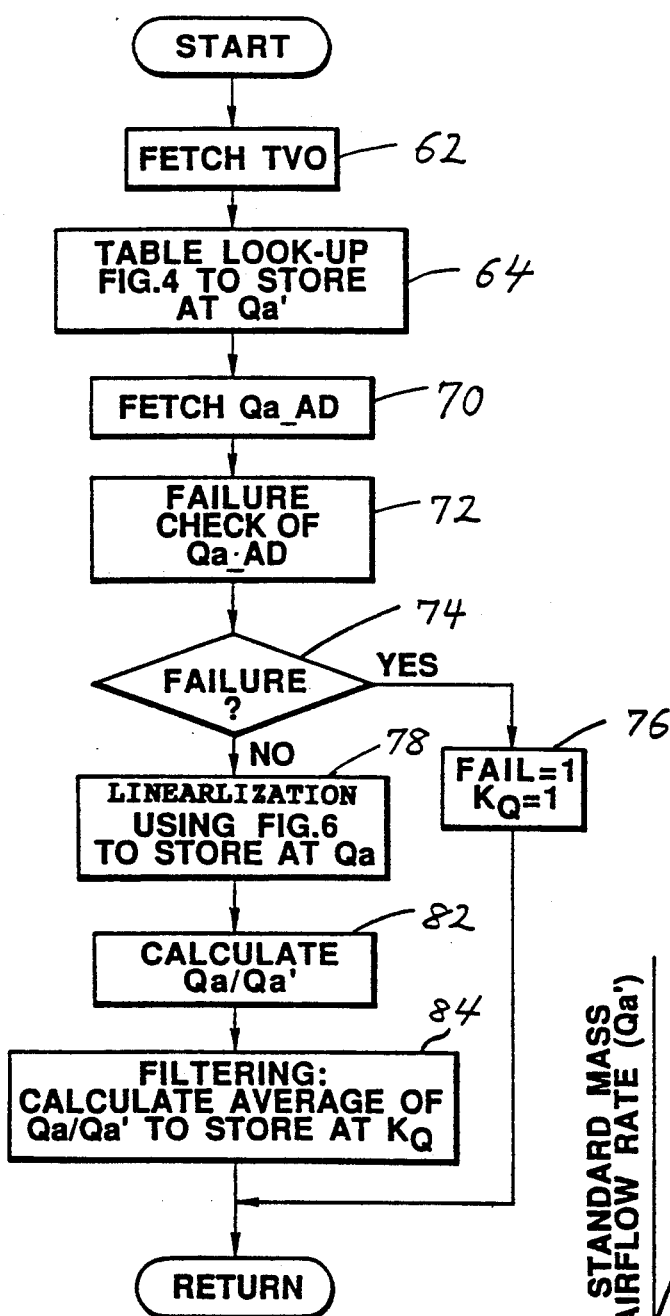
FIG. 2 is a flow diagram of a routine for determining an airflow ratio $K_Q$ derived from $Qa/Qa'$.
Figure 8:
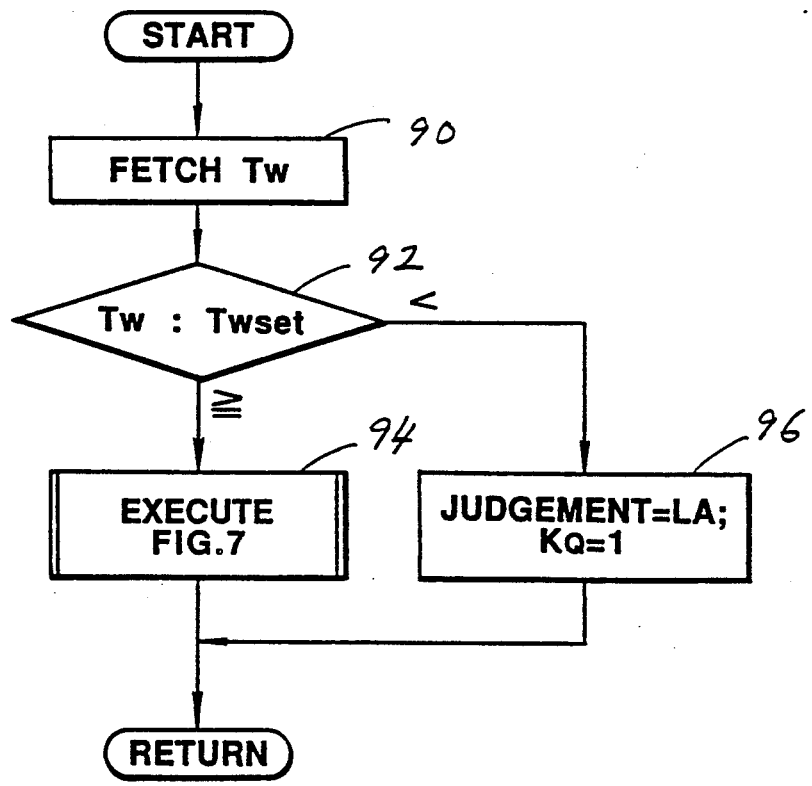
FIG. 8 is a flow diagram of a routine for determining whether execution of the routine shown in FIG. 7 is to be initiated or not.

Referring to FIGS. 2, 7, 8, and 9, FIG. 9 shows a routine for determining an appropriate gear position in accordance with one of a plurality of shift point mapping tables selected in response to a judgement regarding altitude at which the motor vehicle is operating. FIG. 7 shows a routine for deriving the judgement regarding altitude after comparing an airflow ratio $K_Q$ with predetermined values $Q_1$ and $Q_2$. FIG. 2 shows a routine for determining the airflow ratio $K_Q$. Lastly, FIG. 8 shows a routine for determining whether the execution of FIG. 7 routine is justified or not.

Figure 3:
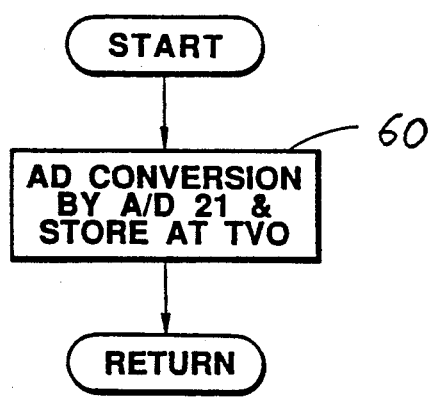
FIG. 3 is a flow diagram of an analog to digital conversion routine wheeby analog output signal of a throttle sensor is converted to digital signal to store the result at TVO.

Referring to FIG. 3, execution of this program is repeated at regular intervals of 5 msec. In FIG. 3, at step 60, analog output signal of throttle sensor 20 is converted to digital signal by A/D converter 21 to store the result at TVO in RAM.

Referring to FIG. 5, execution of this program is repeated at regular intervals of 5 msec. In FIG. 5, at step 86, analog output signal of mass airflow meter 24 is converted to digital signal by A/D converter 25 to store the result at Qa_AD in the RAM.

Actual mass airflow rate detected by the mass airflow meter 24 has a predetermined relationship with the output signal thereof. This predetermined relationship is illustrated by the characteristic curve shown in FIG. 6. In FIG. 6, the vertical axis indicates actual mass airflow rate, while the horizontal axis indicates digital signal produced after analog to digital conversion of the output signal of mass airflow meter 24.

Figure 4:
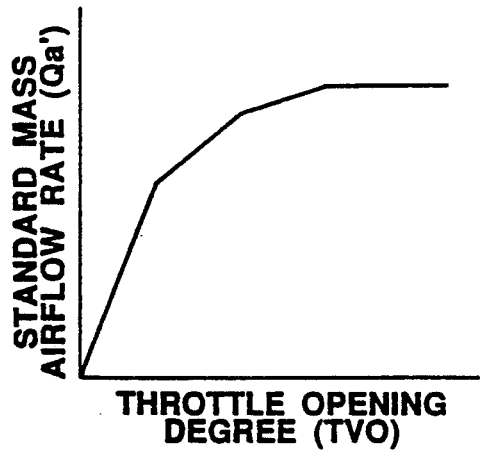
FIG. 4 is a standard airflow rate data table used for table look-up operation in FIG. 2.

Referring to FIG. 2, execution of this program is repeated at regular intervals. In step 62, the digital data TVO is fetched. In step 64, a table look-up operation of FIG. 4 is performed using the data TVO (throttle opening degree) to determine standard mass airflow rate. This result is stored at Qa' as the mass airflow rate. In step 70, the digital data Qa_AD is fetched. In step 72, a failure check of the data Qa_AD is conducted. In step 74, it is determined whether failure exists or not. If the inquiry in step 74 results in affirmative, the program proceeds to step 76 where failure flag FAIL is set and airflow ratio $K_Q$ is not calculated based on the data Qa_AD fetched in step 70. The airflow ratio $K_Q$ is set equal to 1 (one). If the inquiry in step 74 results in a negative response and thus the data Qa_AD fetched in step 70 is reliable, the program proceeds to step 78. In step 78, a table look-up operation of the characteristic curve is shown in FIG. 6 is performed using Qa_AD to store the result at Qa in RAM as actual mass airflow rate. In step 82, a ratio Qa/Qa' is calculated. In step 84, the latest data of Qa/Qa', namely (Qa/Qa')new, is used to update an average, namely (Qa/Qa')av. In this embodiment, the average is a weighted average which is expressed as, $(Qa/Qa')av = (\frac{1}{4}) \times (Qa/Qa')new + (\frac{3}{4}) \times (Qa/Qa')av.$ The average is stored at $K_Q$ in RAM.

Figure 8A:
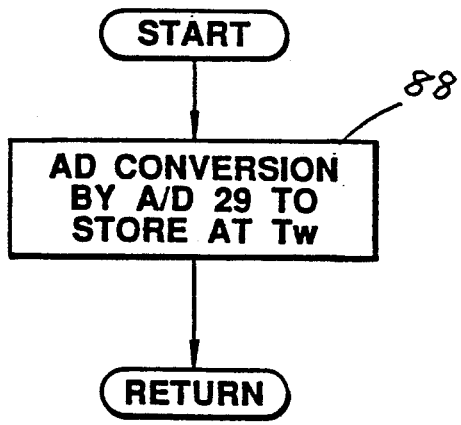
FIG. 8A is a flow diagram of an analog to digital conversion routine whereby an analog output signal of an engine coolant temperature sensor is converted to digital signal to store the result at Tw.

Referring to FIG. 8A, the analog output signal of engine coolant temperature sensor 28 is converted into a digital signal by A/D converter 29, to store the result at Tw in RAM.

Referring to FIG. 8, in step 90, the digital data Tw is fetched. In step 92, it is determined whether the engine coolant temperature Tw is less than a predetermined temperature value Twset or not. If Tw is greater than or equal to Twset, i.e., the engine has been warmed-up, the program proceeds to step 94 where an interruption register is set to initiate execution of FIG. 7 routine. However, if Tw is less than Twset, i.e., the engine is cold, the program proceeds to step 96. In step 96, LA (low altitude) is set at JUDGEMENT in RAM, and airflow ratio $K_Q$ is set equal to 1 (one).

Referring to FIG. 7, at step 98, the digital data $K_Q$ is fetched. In step 100, the content of the JUDGEMENT is checked. The content of JUDGEMENT is either LA (low altitude) or HA (high altitude). If the content of the JUDGEMENT is HA, the program proceeds to step 102. In step 102, it is determined whether $K_Q$ is greater than $Q_1$, or not. If the inquiry in step 102 results in a negative determination, the content of the JUDGEMENT is not altered. If the inquiry in step 100 results in an affirmative determination, the program proceeds to step 104, where the content of the JUDGEMENT is altered to LA. If the inquiry in step 100 results in a JUDGEMENT LA, the program proceeds to step 106. In step 106, it is determined whether $K_Q$ is less than $Q_2$ or not. If the inquiry in step 106 is negative, the content of the JUDGEMENT is not altered. If the inquiry in step 106 is affirmative, the program proceeds to step 108 where the content of the JUDGEMENT is altered to HA. The predetermined values $Q_1$ and $Q_2$ are different, and $Q_1$ is greater than $Q_2$. It is readily seen from the preceding description that symbol HA indicates that the motor vehicle is operating at a high altitude where air density is less, while symbol LA indicates that the motor vehicle is operating at a low altitude, where the air density is greater.

Figure 10:
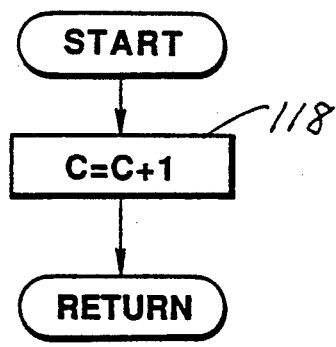
FIGS. 10 and 11 are flow diagrams for calculating vehicle speed (VSP)
Figure 11:
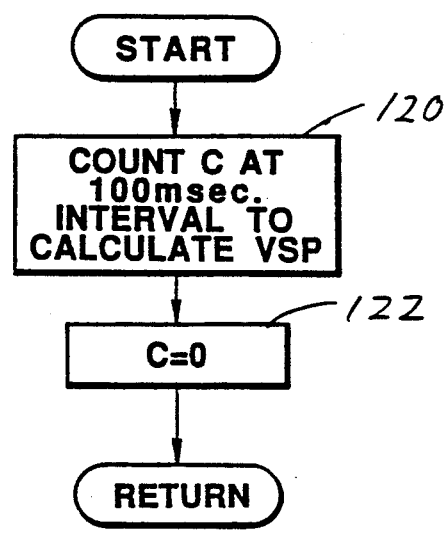

FIGS. 10 and 11 show programs for calculating vehicle speed. Execution of the program shown in FIG. 10 is initiated by a pulse generated by output shaft speed sensor 36. In step 118, an increment of up-counter C is made. Execution of the program shown in FIG. 11 is repeated at regular intervals of 100 msec. In step 120, the content of counter C is counted and the result is used to calculate the vehicle speed. The result of this calculation is stored at VSP as vehicle speed. In step 122, counter C is cleared.

Figure 12:
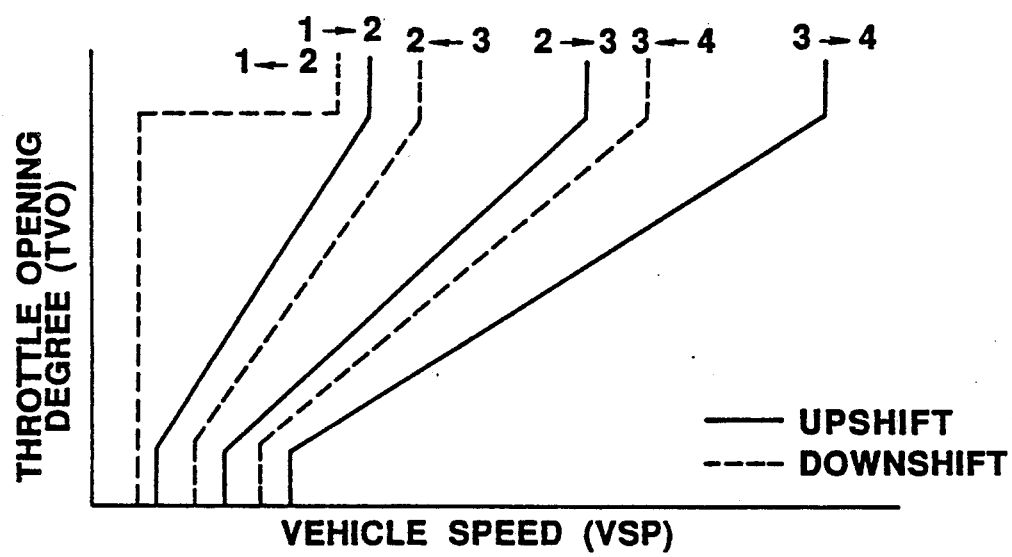
FIG. 12 is a typical example of a shift point mapping table.

Referring to FIG. 9, a step 110, the content of JUDGEMENT (HA or LA) is fetched. Two shift point mapping tables as shown in FIG. 12 are stored in the ROM, one being suitable for motor vehicle operation at low altitude, the other being suitable for motor vehicle operation at high altitude. In step 112, an appropriate one of the shift point mapping tables for JUDGEMENT fetched in step 110 is selected. In steps 114 and 116, the TVO (throttle opening degree) and VSP (vehicle speed) are fetched, respectively. In step 124, a table look-up operation of the selected shift point mapping table as shown in FIG. 12 is performed to determine a desired gear position, and the result is determined at GP as gear position desired. In step 126, shift solenoids 38 and 40 are controlled to accomplish the gear position stored at GP.

Referring again to FIG. 2, in step 84, the weighted average of Qa/No is calculated. This process, often called "filtering", is preferrable in eliminating deviation of Qa/Qa' due to variations in mass airflow rate (Qa) so as to minimize its influence on judgements regarding altitude, for example. Alternatively, a running average may be used instead of the weighted average. The running average is expressed as, $(Qa/Qa')av = (1/N) \times [(Qa/Qa')old_N + (Qa/Qa'-)old_{N-1} \cdots + (Qa/Qa')old_1],$ where
 N: a number of sampled data;
 $(Qa/Qa')old_N$; $(Qa/Qa')old_{N-1}$;
 $(Qa/Qa')old_{N-2}; \ldots (Qa/Qa')old_1$: data sampled in previous cycles.

In FIG. 2, standard mass air flow rate (Qa') is determined on the data table shown in FIG. 4 as a function of throttle opening degree (TVO) only. Alternatively, as shown in FIG. 14, a standard mass airflow rate (Qa') data table may be used. This data table is retrievable not only with throttle opening degree (TVO), but also with engine speed (Ne). The values in this data table are prepared after considering the fact that mass airflow rate varies with variation in engine speed. This data table in FIG. 14 is used in the routine shown in FIG. 13.

Figure 13:
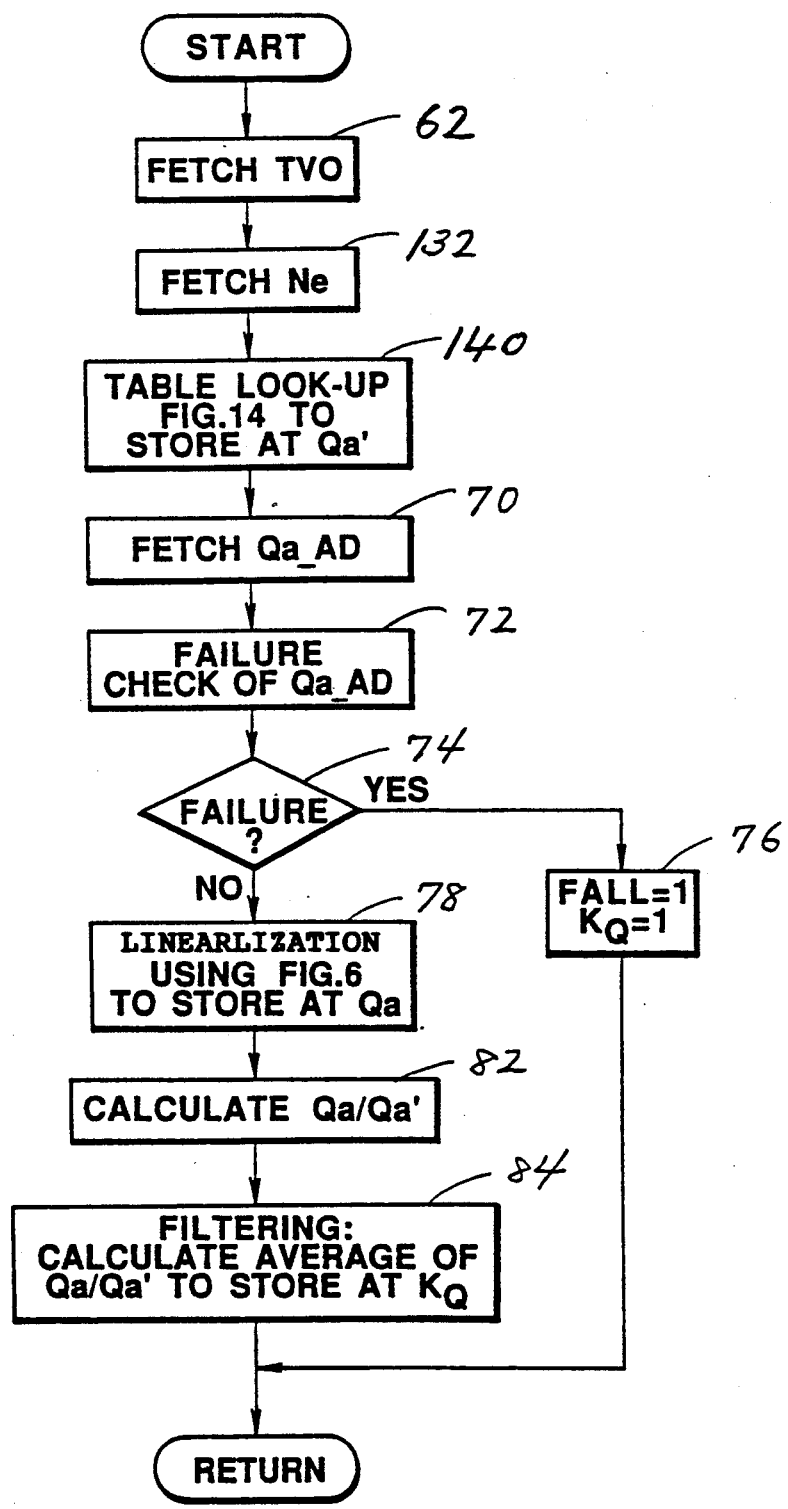
FIG. 13 is a flow diagram similar to FIG. 2, showing an alternative routine.
Figure 13A:
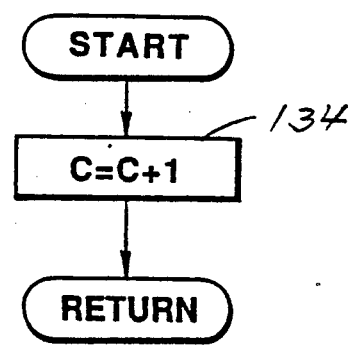
FIGS. 13A and 13B are flow diagrams for calculating revolution speed (No) of transmission output shaft.
Figure 13B:
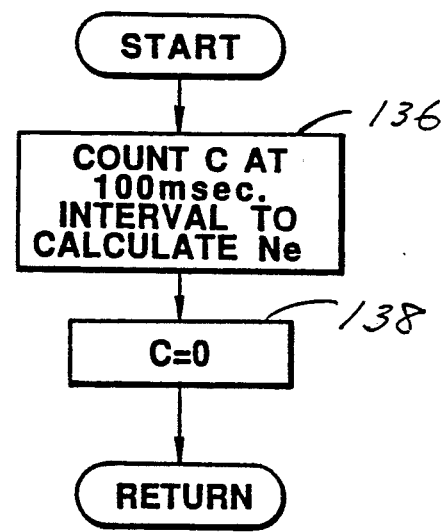
Figure 14:
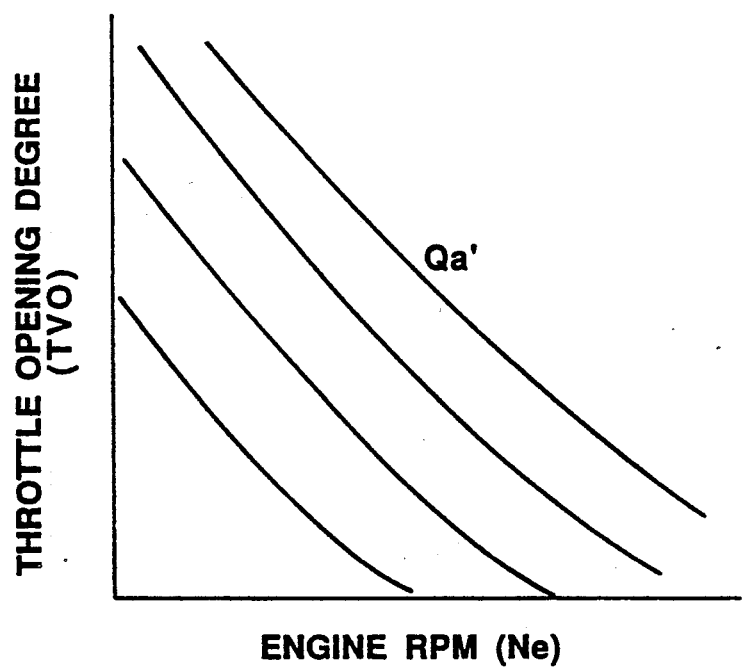
FIG. 14 is a view similar to FIG. 4, showing a standard airflow rate data table used for the table look-up operation in FIG. 13.

Referring to FIG. 13, this routine is substantially the same that of FIG. 2 except that two steps 132 and 140 have replaced the step 64. With the programs shown in FIGS. 13A and 13B, the vehicle speed is calculated. Execution of the program shown in FIG. 13A is initiated by a pulse generated by engine speed sensor 15. In step 134, an increment of up-counter C is made. Execution of the program shown in FIG. 13B is repeated at regular intervals of 100 msec. In step 136, the content of the counter C is counted and the result is used to calculate engine speed. The result of this calculation is stored at Ne in the RAM as engine speed. In step 138, the counter C is cleared.

Referring back to FIG. 13, in step 132, the digital data Ne (engine speed) is fetched, and in step 140, a table look-up operation of FIG. 14 is performed using the data TVO (throttle opening degree) and Ne (engine speed) fetched in steps 62 and 132, respectively.

Referring to FIGS. 16 to 19, another embodiment is described. This embodiment is different from the preceding embodiment in that airflow ratio $K_Q$ is used as a correction coefficient in modifying standard servo activating hydraulic fluid pressure determined in response to throttle opening degree.

Figure 15:
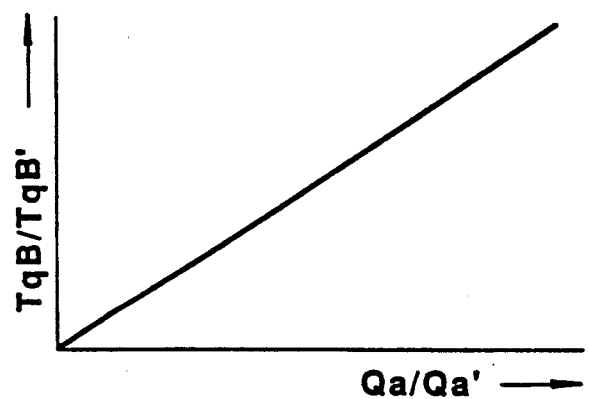
FIG. 15 is a graph illustrating the relationship of torque ratio (TqB/TqB') and airflow ratio (Qa/Qa')

Before discussing the embodiment of FIGS. 16 to 19, the mass airflow ratio $K_Q$ ($=Qa/Qa'$) is further described in connection with FIG. 15. Since engine torque is in proportion to the mass air flow rate, the mass airflow ratio $K_Q$ is proportional to a ratio of actual engine torque to standard engine torque. FIG. 15 shows this relationship. In FIG. 15, the vertical axis indicates the ratio of actual transmission output torque (TqB) to standard transmission output torque (TqB').

Figure 16A:
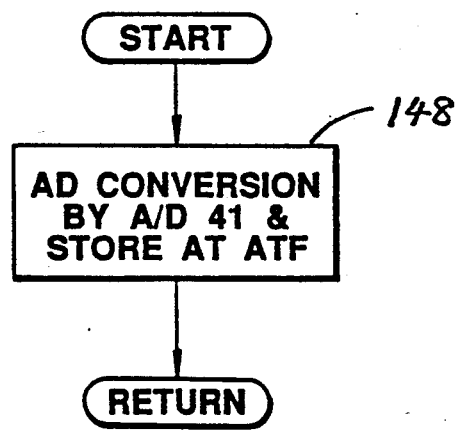
FIG. 16A is a flow diagram of an analog to digital conversion routine whereby an analog output signal of automatic transmission fluid (ATF) temperature sensor is converted to a digital signal, to store the result at ATF.

Referring to FIG. 16A, analog output signal of ATF temperature sensor 28 is converted to digital signal by A/D converter 29 to store the result at ATF as automatic transmission fluid temperature.

Referring to FIG. 16, in step 150, the data ATF (automatic transmission fluid temperature) is fetched. In step 152, it is determined whether or not ATF is lower than a predetermined temperature value L, for example 60° C. If this inquiry is affirmative, the program proceeds to step 154 where a table look-up operation of a line pressure table for low temperature is performed using the throttle opening degree to give the duty duration D(P1). Then, the program proceeds to step 164. In step 164, the OFF duty duration per ON-OFF cycle of line pressure solenoid 37 (see FIG. 1) is modulated in response to the duty D(Pl) given by the predetermined line pressure control strategy in step 154. If the inquiry in step 152 is negative, the program proceeds to step 156, where it is determined whether or not automatic transmission 12 is in a stable state, after comparing a desired gear position with an actual position. If the desired gear position is equal to the actual gear position, a ratio shift is not required, and thus the transmission 12 is in stable state, and thus the inquiry in step 156 results is affirmative. In this case, the program proceeds from step 156 to step 154. In step 154, a table look-up operation of a line pressure table for the usual temperature is performed using throttle opening degree (TVO) to give the duty duration D(P1). Then, in step 164, the line pressure solenoid 37 is controlled on the duty D(P1) obtained in step 54 to give a stable-state line pressure vs., throttle opening degree characteristic. The line pressure control performed in step 154 is substantially the same as the conventional line pressure control described on Pages I-29 to I-30 of the publication "NISSAN FULL-RANGE AUTOMATIC TRANSMISSION RE4R03A TYPE, SERVICE MANUAL, (A261C10)."

If the inquiry is step 156 results in negative, and a ratio shift is required, the program proceeds to steps 200, 202, and 204 to carry out a servo activating hydraulic fluid pressure control based on the airflow ratio $K_Q$ determined by executing the routine shown in FIGS. 2 or FIG. 13. In step 200, a table look-up operation of the standard servo activating hydraulic pressure table shown in FIG. 17 is performed using data TVO, i.e., throttle opening degree, fetched in step 62 in FIG. 2 or 13 to store the result at PI(s) in a RAM. The data stored at PI(s) is called standard servo activating hydraulic pressure. In step 202, the standard servo activating hydraulic fluid pressure PI(s) is corrected with the airflow ratio $K_Q$ by performing multiplication $K_Q \times PI(s)$, for example, to store the result at PI. In step 204, this pressure data PI is increased by a predetermined value PI$_{OFS}$. In step 162, a table look-up operation of a duty conversion table shown in FIG. 18 is performed using pressure data PI to give the duty duration D(Pl). Then, in step 164, line pressure solenoid 37 is controlled in response to duty D(Pl) determined in step 162. Referring to step 204, the predetermined value PI$_{OFS}$ is a value determined for athe force of a return spring of a servo of an on-coming friction device to be engaged during the ratio shift. As shown in FIG. 19, ON-OFF cycle of line pressure solenoid 37 is repeated 50 times per second. Thus, one cycle is 20 msec, its frequency is 50 Hz. OFF duration in one cycle is determined by duty D(Pl). The relationship between servo activating hydraulic pressure (line pressure) and duty D(Pl) is such that the hydraulic fluid pressure is in proportion to duty D(Pl).

Figure 20A:
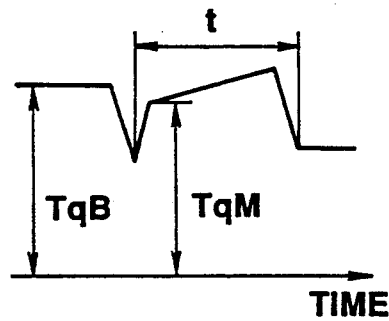
FIGS. 20A and 20B are torque curves during a 1-2 upshift at different altitudes with the same throttle opening degree when an on-coming friction device is engaged by the standard servo activating hydraulic fluid pressure determined in response to the throttle opening degree.
Figure 20B:
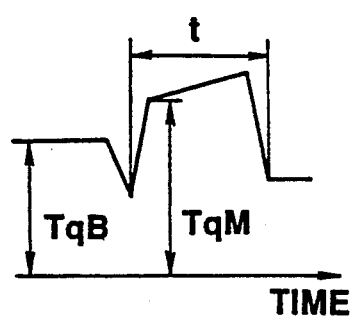

Referring to FIGS. 20A and 20B, these describe the influence on a ratio shift of variance in the atmospheric pressure, and referring to FIGS. 21A and 21B, these described how the influence is removed due to correction of the servo activating hydraulic pressure according to the embodiment described in connection mainly with FIG. 16.

In determining servo activating hydraulic fluid pressure for a ratio shift, for example, 1-2 upshift, it is the conventional practice to use a pressure table, as shown in FIG. 17, which contains optimum servo activating hydraulic pressure values for 1-2 upshift versus different throttle opening degree values. The pressure values of the table are set for optimum performance of an on-coming friction device during the upshift under standard conditions where the upshift is initiated at a preset vehicle speed for a given throttle opening degree in accordance with a shift point mapping for drive range, at low altitude, and at medium ambient temperature.

FIGS. 20A and 20B show torque curves during the upshift occurring at the same shift point with the same throttle opening degree but at different altitudes. In these torque curves, reference characters TqB and TqM denote torque before shift and torque during shift, respectively. Reference character t denotes a time interval of inertia phase. Torque TqM is mainly determined by servo activating hydraulic fluid pressure supplied to the on-coming friction device, and thus remains invariable over variance in torque TqB due to change in air density since servo activating hydraulic fluid pressure determined for the same throttle opening degree is fixed.

Quality of shift may be evaluated by a ratio TqB/TqM. This ratio is optimum in FIG. 20A, since the servo activating hydraulic fluid pressure is so adjusted as to provide a good shift at low altitude. At high altitude with low atmospheric pressure, air density drops to cause a drop in engine output.

As seen from FIG. 20B in comparison with FIG. 20A, torque TqB drops at high altitude where air density is low. However, energy to be absorbed during the inertia phase and torque TqM remains invariable. Thus, the time interval t for inertia phase becomes short at high altitude, and ratio TqB/TqM deviates from the optimum value.

Adaptive correction of variance in shift quality due to altitude variability is described in connection with FIGS. 21A and 21B.

Figure 21A:
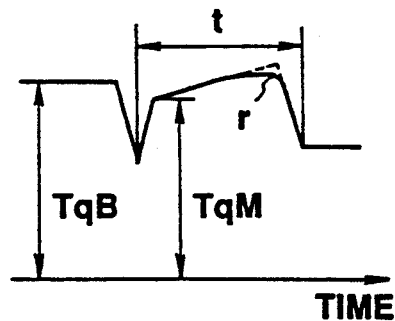
FIGS. 21A and 21B are torque curves during a 1-2 upshift at the different altitudes as above with the same throttle opening degree when on-coming friction device is engaged by the servo activating hydraulic fluid pressure modified, in response to airflow ratio $K_Q$.
Figure 21B:
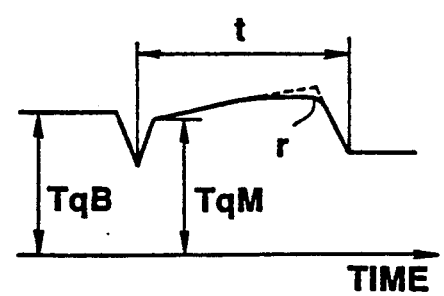

FIG. 21A shows a torque curve during 1-2 upshift under the same condition as in FIG. 20A. Similarly, FIG. 21B shows a torque curve during the upshift under the same condition as in FIG. 20B. Referring to FIG. 21B, since airflow ratio $K_Q$ is multiplied with the standard hydraulic fluid pressure, torque TqM determined by the servo activating hydraulic fluid pressure corrected drops as torque TqB drops the due to a change in air density. Thus, ratio TqB/TqM is kept optimum at high altitude.

Figure 22A:
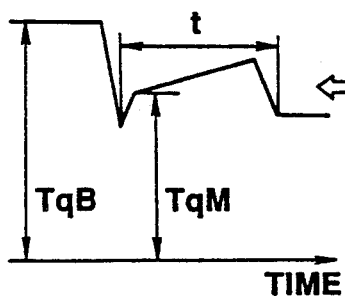
FIGS. 22A, 22B, and 22C are torque curves during 1-2 upshift at different vehicle speeds with the same throttle opening degree when an on-coming friction device is engaged by the standard servo activating hydraulic fluid pressure determined in response to the throttle opening degree.
Figure 22B:
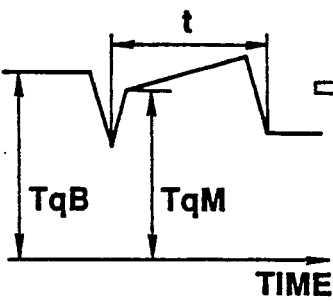
Figure 22C:
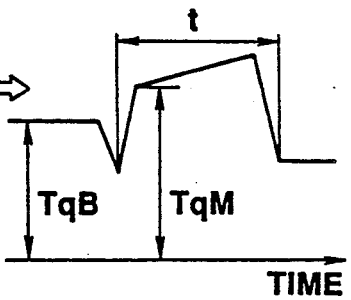
Figure 23A:
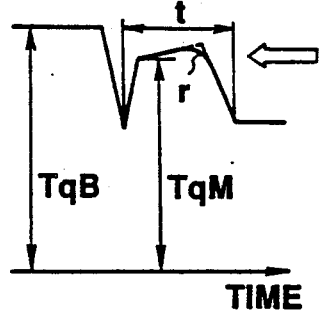
FIGS. 23A, 23B, and 23C are torque curves during 1-2 upshift at the different vehicle speeds, as above, with the same throttle opening degree when an on-coming friction device is engaged by the servo activating hydraulic fluid pressure modified in response to airflow ratio $K_Q$.
Figure 23B:
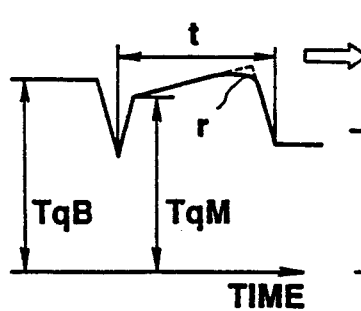
Figure 23C:
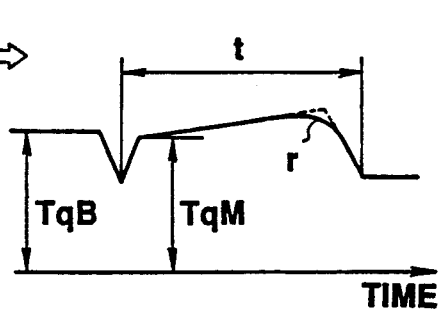

Let us now consider 1-2 upshift at different vehicle speeds with the same throttle opening degree. FIGS. 22A, 22B, and 22C show torque curves during the upshift when servo activating hydraulic fluid pressure is determined in response to throttle opening degree. FIGS. 23A, 23B, and 23C show torque curves during the upshift when servo activating hydraulic fluid pressure is corrected with airflow ratio $K_Q$.

As readily seen from FIGS. 22A and 22C in comparison with FIG. 22B, torque TqB becomes large at low vehicle speed L, while it becomes small at high vehicle speed H. Thus, torque TqB is in inverse proportion to vehicle speed.

Energy to be absorbed during inertia phase is in proportion to vehicle speed, and a difference in torque before and after the shift is in proportion to torque TqB. However, the time interval t for the inertia phase remains almost unchanged since torque TqB is in inverse proportion to vehicle speed.

Ratio TqB/TqM is optimum in FIG. 22B since servo activating hydraulic fluid pressure is so adjusted as to provide a good shift at the preset vehicle speed. In FIGS. 22A and 22C, this ratio deviates from the optimum value since torque TqM remains the same even though torque TqB becomes large at low vehicle speed (FIG. 22A) and becomes small at high vehicle speed (FIG. 22C). This variance in shift quality is difficult to correct if servo activating hydraulic fluid pressure is determined only in response to throttle opening degree.

Referring to FIGS. 23A, 23B, and 23C, adaptive correction of variance in shift quality due to shift point variability is described. Torque curves shown in FIGS. 23A, 23B, and 23C result from varying torque TqM by correcting servo activating hydraulic fluid pressure with airflow ratio $K_Q$. FIGS. 23A, 23B, and 23C correspond to FIGS. 22A, 22B, and 22C, respectively, in that they show torque curves during the upshift at the three different shift points. As will be appreciated from comparing FIG. 23A with FIG. 22A, and comparing FIG. 23C with FIG. 22C, torque TqM is increased in FIG. 23A and decreased in FIG. 23C since servo activating hydraulic fluid pressure is corrected with airflow ratio $K_Q$. Since $K_Q$ is in proportion to torque TqB, relative to torque TqB in FIG. 23B, torque TqM is in proportion to TqB. Thus, ratio TqB/TqM is kept optimum over a wide range of shift point variability.

Energy to be absorbed during inertia phase is in proportion to vehicle speed, and a difference in torque before and after the shift is determined in response to torque TqB. Thus, as shown in FIGS. 23A, 23B, and 23C, the time interval t for the inertia is short at low vehicle speed (see FIG. 23A), while it is long at high vehicle speed (see FIG. 23C).

Energy to be absorbed during inertia phase is the same if the shift point is the same. Since torque TqM becomes larger in FIG. 23A than in FIG. 22A, the time interval t becomes shorter in FIG. 23A than in FIG. 22A. Similarly, since TqM becomes smaller in FIG. 23C than in FIG. 22C, the time interval t becomes longer in FIG. 23C than in FIG. 22C.

From the preceding description in connection with FIGS. 23A, 23B, and 23C, it will now be understood that servo activating hydraulic fluid pressure during the ratio shift is corrected such that ratio TqB/TqM is always optimum. Thus, good shift quality is maintained over a wide range of shift point variability.

Figures 24A, 24B, 24C:
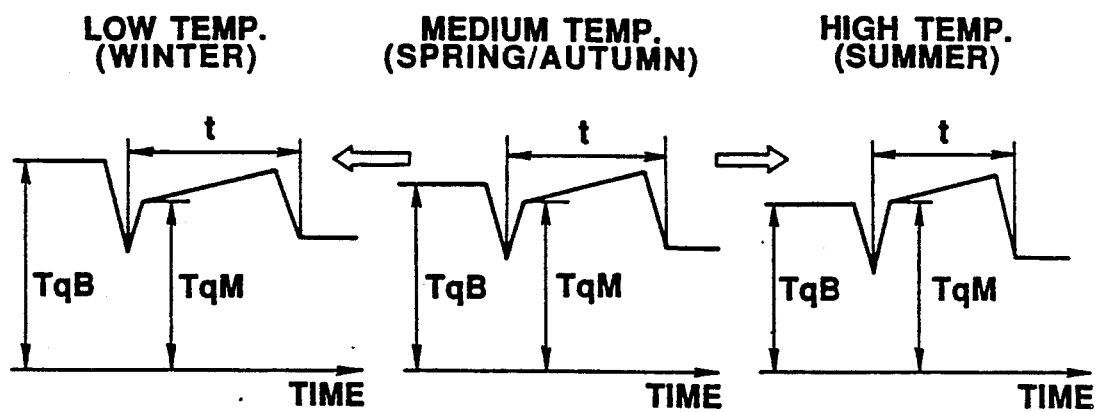
FIGS. 24A, 24B, and 24C are torque curves during an 1-2 upshift at different ambient temperatures, with the same throttle opening degree when the on-coming friction device is engaged by the standard servo activating hydraulic fluid pressure determined in response to throttle opening degree.
Figures 25A, 25B, 25C:
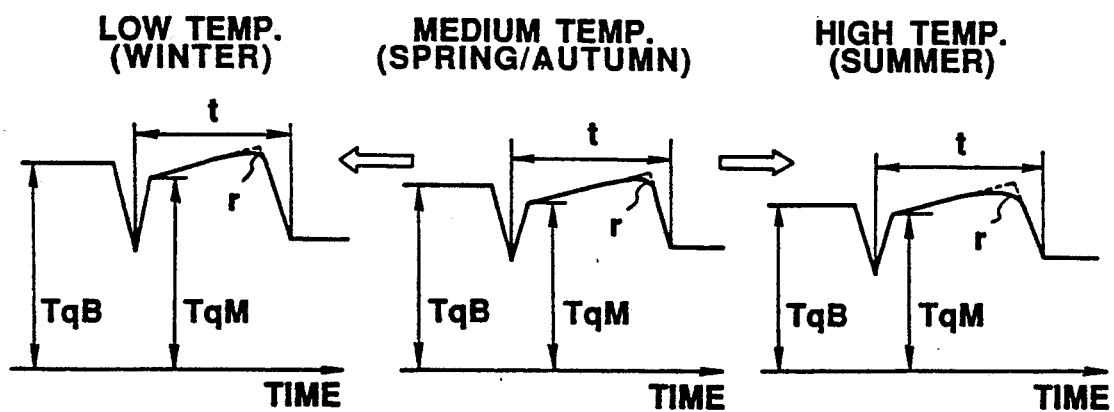
FIGS. 25A, 25B and 25C are torque curves during a 1-2 upshift at the different ambient temperatures, with the same throttle opening degree when on-coming friction device is engaged by the servo activating hydraulic fluid pressure modified in response to the airflow ratio $K_Q$.

FIGS. 24A, 24B, and 24C, describe the influence on ratio shift due to variance in ambient temperature, and FIGS. 25A, 25B, and 25C describe how such influence is removed according to the servo activating hydraulic pressure corrected with airflow ratio $K_Q$.

As mentioned, according to conventional practice, servo activating hydraulic fluid pressure is determined in response to throttle opening degree and so adjusted as to provide a good shift at medium ambient temperature. Air density increases as ambient temperature decreases in winter, while it decreases as ambient temperature increases in summer. Engine output increases in response to an increase in air density, while it decreases in response to a decrease in air density. FIGS. 24A, 24B, and 24C show torque curves during 1-2 upshift occurring at the same shift point with the same throttle opening degree but at different ambient temperatures. As seen from FIG. 24A in comparison with FIG. 24B, torque TqB increases at low temperature, while as seen from FIG. 24C in comparison with FIG. 24B, torque TqB decreases at high temperature. Since torque TqM remains invariable, ratio TqB/TqM deviates from the optimum value in FIGS. 24A and 24C.

Adaptive correction of a variance in shift quality is described in connection with FIGS. 25A, 25B and 25C.

FIG. 25B shows a torque curve during 1-2 upshift under the same condition as in FIG. 24B. Similarly, FIGS. 25A and 25C show torque curves during the upshift under the same condition as in FIG. 24A and 24C. Referring to FIGS. 25A and 25C, since $K_Q$ is in proportion to a ratio of torque TqB relative to standard torque TqB as shown in FIG. 25B, torque TqM determined by servo activating hydraulic fluid pressure corrected with $K_Q$ varies in accordance with air density variability. Thus, ratio TqB/TqM is kept optimum over wide range of ambient temperature variability.

Referring again to FIGS. 21A and 21B, it is seen that the trailing edge of the torque curves are rounded, as denoted by the reference characters r. This is caused by the fact that $K_Q$ drops in response to a reduction in intake airflow near the end of shift, and servo activating hydraulic fluid pressure also drops. The same characteristic is seen in FIGS. 23A, 23B, 23C, 25A, 25B, and 25C. This characteristic improves shift quality.

If a turbo charged engine is used, turbo lag is unavoidable. With the same throttle opening degree, a ratio shift with turbo in operation and the same shift with turbo not yet in operation show different shift qualities when servo activating hydraulic fluid pressure is determined in response to throttle opening degree. This is because there is a difference in torque TqB. This variance in shift quality is corrected by effecting shift on servo activating hydraulic fluid pressure corrected with airflow ratio $K_Q$.

What is claimed is:

1. A system for the adaptive control of a motor vehicle having an engine, means for determining the amount of air admitted to the engine at various altitudes, and means for measuring the throttle opening for the engine; wherein an airflow ratio between an actual airflow rate of intake air admitted to the engine for a given power demand and a standard airflow rate predetermined for said given power demand on the engine is used to determine a change in ambient altitude in which the engine is operating.

2. A system as claimed in claim 1, wherein the power demand is detected by the engine throttle opening degree.

3. A system as claimed in claim 2, wherein there is provided a data table whereby said standard airflow rate is retrievable for said given power demand.

4. A system as claimed in claim 3, wherein said airflow ratio results from dividing said airflow rate by said standard airflow rate.

5. A system as claimed in claim 4, wherein said airflow ratio is compared with a predetermined value to determine whether the ambient altitude has changed.

6. A system as claimed in claim 4, wherein said airflow ratio is used in the optional shifting of an automatic transmission.

7. A system as claimed in claim 4, wherein an automatic transmission is drivingly connected to the engine and operable on a standard servo activating hydraulic fluid pressure that is determined tin response to said power demand, and said airflow ratio is used as a coefficient in correcting said standard servo activating fluid pressure.

8. A method of determining an altitude in which a motor vehicle is operating, the motor vehicle including an engine with a throttle valve which opens in degrees, the method comprising the steps of:
    detecting the throttle opening degree;
    setting data containing standard airflow rate values versus throttle opening degree values;
    determining a standard airflow rate versus said throttle opening degree detected from said data set;
    detecting an actual airflow rate of intake air admitted to the engine during operation with said throttle opening degree detected;
    calculating an airflow ratio of said actual detected airflow rate to said determined standard airflow rate; and
    deriving a judgement as to the altitude from said airflow ratio calculated.

9. A method of determining an altitude in which a motor vehicle is operating, the motor vehicle including an engine with a throttle value which opens in degrees, the method comprising the steps of:
    detecting the throttle opening degree;
    detecting the engine speed;
    setting data containing standard airflow rate values versus throttle opening degree values and engine speed values;
    determining a standard air flow rate versus said throttle opening degree detected and said engine speed detected from said data set;
    detected an actual airflow rate of intake air admitted to the engine during operation at said engine speed detected with said throttle opening degree detected;
    calculating an airflow ratio of said airflow rate detected to said standard airflow rate determined; and
    deriving a judgement as to the altitude from said airflow ratio calculated.

10. A method of determining an altitude in which a motor vehicle is operating, the motor vehicle including an engine with a throttle valve which opens in degrees, the method comprising the steps of:
    detecting the throttle opening degree;
    setting data containing standard airflow rate values versus throttle opening degree values;
    determining a standard airflow rate versus said throttle opening degree from said data set;
    detecting an actual airflow rate of intake air admitted to the engine during operation with said throttle opening degree detected;
    calculating an airflow ratio of said airflow rate detected to said standard airflow rate determined;
    averaging said airflow ratio calculated; and
    deriving a judgement as to the altitude from said airflow ratio averaged.

11. A method of determining an altitude in which a motor vehicle is operating, the motor vehicle including an engine with a throttle valve which opens in degrees, the method comprising the steps of:
    detecting the throttle opening degree;
    detecting engine speed;
    setting data containing standard airflow rate values versus throttle opening degree values and engine speed values;
    determining a standard airflow rate versus said throttle opening degree and engine speed from said data set;
    detecting an airflow rate of intake air admitted to the engine during operation at said engine speed detected with said throttle opening degree detected;
    calculating an airflow ratio of said airflow rate detected to said standard airflow rate determined;
    averaging said airflow ratio calculated; and
    deriving a judgment as to the altitude from said airflow ratio averaged.

12. A method of adaptive correction of servo activating hydraulic fluid pressure of an automatic transmission of a motor vehicle including an engine with a throttle valve which opens in degrees, the method comprising the steps of:
    detecting the throttle opening degree;
    setting data containing standard airflow rate values versus throttle opening degree values;
    determining a standard airflow rate versus said throttle opening degree detected from said data set;
    detecting an actual airflow rate of intake air admitted to the engine during operation with said throttle opening degree detected;
    determining an airflow ratio of said actual airflow rate detected to said standard airflow are determined;

determining a standard servo activating hydraulic fluid pressure in response to said throttle opening degree detected; and modifying said standard servo activating hydraulic fluid pressure in response to said airflow ratio determined.

13. A method of adaptive correction of servo activating hydraulic fluid pressure of an automatic transmission of a motor vehicle including an engine with a throttle valve which opens in degrees, the method comprising the steps of:

detecting the throttle opening degree;

detecting the engine speed;

setting data containing standard airflow rate values versus throttle opening degree values and engine speed values;

determining a standard airflow rate versus said throttle opening degree detected and said engine speed detected from said data set;

detecting an actual airflow rate of intake air admitted to the engine during operation at said engine speed detected with said throttle opening degree detected;

determining an airflow ratio of said actual airflow rate detected to said standard airflow rate determined;

determining a standard servo activating hydraulic fluid pressure in response to said throttle opening degree detected; and modifying said standard servo activating hydraulic fluid pressure in response to said airflow ratio determined.

14. In a motor vehicle:

an engine having an intake passage and a throttle valve which is disposed in said intake passage and opens in degrees;

an automatic transmission drivingly connected to said engine;

a throttle sensor means for detecting an opening degree of said throttle valve and generating a throttle opening degree indicative signal indicative of said opening degree of said throttle valve detected;

a mass air flow meter means disposed upstream of said throttle valve for detecting an actual mass airflow rate of intake air passing through said intake passage and generating an actual mass airflow rate indicative signal indicative of said actual mass air flow rate detected;

a control unit operatively connected to said throttle sensor means and said mass air flow meter means said control unit including;

means for storing a data containing standard mass airflow rate values versus varying throttle opening degree values;

means for retrieving said data based on throttle opening degree indicative signal and determining a standard mass airflow rate;

means for dividing said actual mass airflow rate indicated by said actual mass airflow rate indicated signal by said standard mass airflow rate determined to give the result as an airflow ratio; and means for averaging said airflow ratio and generating an averaged airflow ratio;

means for deriving a judgement as to an altitude in which said engine is operating from said averaged airflow rate and generating an output signal indicative of a result of said judgement; and means responsive to said output signal for modifying operation of said automatic transmission.

15. In a motor vehicle:

an engine having an intake passage and a throttle valve which is disposed in said intake passage and opens in degrees;

an automatic transmission drivingly connected to said engine;

a throttle sensor means for detecting an opening degree of said throttle valve and generating a throttle opening degree indicative signal indicative of said opening degree of said throttle valve detected;

a mass airflow meter means disposed upstream of said throttle valve for detecting an actual mass airflow rate of intake air passing through said intake passage and generating an actual mass airflow rate indicative signal indicative of said actual mass air flow rate detected;

a control unit operatively connected to said throttle sensor means and said mass air flow meter means, said control unit including, means for storing a data containing standard mass airflow rate values versus varying throttle opening degree values;

means for retrieving said data based on said throttle opening degree indicative signal and determining a standard mass airflow rate;

means for dividing said actual mass airflow rate indicated by said actual mass airflow rate indicative signal by said standard mass airflow rate determined to give the result as an airflow ratio;

means for averaging said airflow ratio and generating an averaged airflow ratio;

means for determining a line hydraulic fluid pressure valve in response to said averaged airflow ratio and generating an output signal indicative of said line hydraulic fluid pressure value determined; and means responsive to said output signal for adjusting a line hydraulic fluid pressure on which said automatic transmission operates.

* * * * *